United States Patent [19]

Brands et al.

[11] Patent Number: 5,338,601
[45] Date of Patent: Aug. 16, 1994

[54] POLYOLEFIN BARRIER FILMS FOR PREVENTING SOLVENT ATTACK ON PLASTIC RESINS

[75] Inventors: Jan Brands, Terneuzen; Henri J. M. Grünbauer, Oostburg; Kees-Jeen van Duin, Terneuzen, all of Netherlands

[73] Assignee: The Dow Chemical Company, Midland, Mich.

[21] Appl. No.: 630,671

[22] Filed: Dec. 20, 1990

[51] Int. Cl.$^5$ .............................................. B32B 3/26
[52] U.S. Cl. ................................. 428/319.7; 220/444; 220/467; 220/902; 312/406; 312/406.1; 428/71; 428/314.4; 428/516
[58] Field of Search ............... 220/444, 467, 902; 264/46.6; 312/214, 236, 400, 401, 405, 405.1, 406, 406.1, 406.2, 409; 428/314.4, 319.7, 71, 314.8, 516

[56] References Cited

U.S. PATENT DOCUMENTS

| | | | |
|---|---|---|---|
| 3,091,946 | 6/1963 | Kesling | 428/319.7 |
| 3,533,901 | 10/1970 | Sutker | 428/318.4 |
| 3,608,006 | 9/1971 | Hosoda et al. | 428/319.9 |
| 3,960,631 | 6/1976 | Weiss et al. | 312/406.1 |
| 4,707,401 | 11/1987 | Benford | 312/406 |

Primary Examiner—William J. Van Balen

[57] ABSTRACT

This invention relates to the use of a barrier film, being a thermoplastic linear polyolefin resin, to protect a styrenic resin sheet which constitutes the inner liner wall of an insulative cabinet wall of, for example, a refrigeration appliance unit from attack by the halogen-containing blowing agents present in the insulative polyurethane foam found within the cabinet wall. Preferred thermoplastic linear polyolefin resins are linear low density polyethylene.

10 Claims, No Drawings

POLYOLEFIN BARRIER FILMS FOR PREVENTING SOLVENT ATTACK ON PLASTIC RESINS

BACKGROUND OF THE INVENTION

This invention pertains to an insulative cabinet wall comprising a barrier film used to protect plastic resins employed in the construction of the wall from attack by solvents. More specifically this invention relates to the use of barrier films consisting essentially of a linear polyethylene polymer to protect styrenic resins such as, for example, high impact polystyrene (HIPS) or acrylonitrile-butadiene-styrene (ABS) copolymers.

Styrenic resins are frequently susceptible to solvent attack by compounds, especially the halocarbon compounds used as blowing agents in the preparation of the insulative material contained within, for example, an appliance unit such as a refrigeration or boiler.

The styrenic resin may be attacked by the halocarbon compounds becoming weakened and susceptible to failure and fracture. Material susceptible to attack in such manner is not desirable in an appliance unit as it can lead to loss in the overall thermal insulating efficiency of the unit and in some instances give rise to structural strength problems and eventual deformation of the unit.

It is known that the composition of the styrenic resin may be modified to increase its resistance to attack from solvents. Greater resistance to some solvents, especially halogenated solvents, can be obtained by increasing the acrylonitrile content of an ABS copolymer or introducing a greater rubber content, see for example, U.S. Pat. No. 4,144,206. However, such a solution is not always feasible as other physical properties of the material such as impact strength or more critically moldability may change making them unsuitable for the intended application An alternative to modifying the composition of the styrenic resin is to protect such material by the use of a barrier film or layer, wherein the insulative material is prevented from contacting the styrenic resin see, for example, U.S. Pat. No. 3,960,631. In this document the use of a coextruded film comprising a low density polyethylene and an ethylene acrylic acid copolymer is disclosed. The film provides a physical barrier preventing adhesion of the insulative polyurethane foam to the styrenic resin. Preventing such adhesion greatly reduces environmental stress crack failure thereby significantly reducing the formation of fracture sites in the styrenic resin. Such fracture sites are the principal points where solvent attack can subsequently take place weakening and eventually allowing the polymer matrix to break. Similar barrier films serving the purpose to restrict adhesion and minimize stress crack failure are also disclosed in U.S. Pat. No. 4,707,401 and U.S. Pat. No. 4,196,950. In U.S. Pat. No. 4,005,919 use of barrier films in conjunction with ABS liner material is disclosed wherein the barrier film is a rubber-modified high nitrile polymer.

Such barrier films as described above are capable of offering some protection indirectly by minimizing occurrence of stress failure sites of the liner from attack by the halogenated compounds such as, for example, trichlorofluoromethane (Refrigerant-11) frequently employed in the manufacture of polyurethane foam. However, the continued use of certain fully halogenated compounds and especially trichlorofluoromethane is undesirable in view of the current opinion that their presence in earth's upper atmosphere may be a contributory factor in the recently observed reduction of ozone concentrations.

Recent developments in polyurethane technology has led to the identification of certain hydrogen-containing halogenated carbon compounds as being suitable physical blowing agent replacements for the traditionally employed fully halogenated chlorofluorocarbon compounds. Such recently identified alternative blowing agents are the "soft" chlorofluorocarbon compounds (HCFCs) and include dichlorotrifluoroethane (Refrigerant-123) and dichlorofluoroethane (Refrigerant-141b). These compounds are described as "soft" compounds due to the presence of hydrogen on the carbon backbone and are characterized by having very low or negligible ozone depletion potentials in contrast to the "hard", fully halogenated compounds.

However, in recent evaluation studies of the "soft" chlorofluorocarbon compounds a severe problem of attack on the styrenic resins used as liner material in the preparation of insulative cabinet walls has been observed. Liners comprising a film present for the purpose of preventing adhesion of polyurethane foam to the styrenic resin, such as described in U.S. Pat. No. 3,960,631, are also apparently susceptible to attack by such "soft" chlorofluorocarbon compounds. Thus indicating, that the material currently used as a physical adhesion barrier does not have sufficient chemical barrier properties to prevent attack by the halogenated blowing agent.

It is also apparent from evaluation studies that the aggressivity of some of the HCFC compounds, particularly Refrigerant-123 and isomers thereof, towards styrenic resins typically used in the construction of insulative cabinet walls is too great to be conveniently overcome by chemical modification of the composition of the styrenic resin without, for example, a significant loss in the desirable moldability of the resin.

It is therefore of interest to consider the possibility of modifying or using an alternative barrier film. Desirably, such an alternative barrier film should allow for efficient preparation of the shaped liner employed in the appliance unit and more importantly minimize or prevent attack of the styrenic resin by blowing agents, especially the newly identified HCFCs, used in manufacturing the polyurethane foam.

SUMMARY OF THE INVENTION

It has now been discovered that certain thermoplastic polyolefin material can adequately function as such a barrier film in insulative cabinet walls containing polyurethane foam, and especially where such foam is prepared in the presence of "soft" blowing agents.

In one aspect, this invention is an insulative cabinet wall structure suitable for use in a thermally insulated apparatus which comprises:

a. an outer wall element;

b. an inner wall element comprising a styrene-based thermoplastic resin;

c. a foamed-in-situ polyurethane foam contiguous to said outer wall element and positioned between said outer wall element and said inner wall element; and d. a barrier film interposed between said foamed-in-situ polyurethane foam and said inner wall element, characterized in that the barrier film comprises a thermoplastic linear polyolefin resin.

In a second aspect, this invention is a composite material suitable for thermolding applications which comprises:

a styrene-based thermoplastic resin sheet; and
a barrier film in contact with said resin sheet,
characterized in that the barrier film is present in a thickness of at least 0.3 percent of the total thickness of the resin sheet and barrier film, and in that the barrier film comprises a thermoplastic linear polyolefin resin.

Our investigations have surprisingly shown that the use of a thermoplastic linear polyolefin resin, particularly a linear polyethylene resin, as a barrier film adequately protects the thermoplastic resin material employed in the construction of insulative cabinet walls from attack by the halogenated blowing agent present in the polyurethane foam.

DETAILED DESCRIPTION OF THE INVENTION

The insulative cabinet wall of this invention can be that of, for example, a refrigeration appliance unit or a boiler housing. Such a unit generally comprises an outer cabinet wall (1), which may be, for example, a metal sheet or foil, wood, synthetic resin or the like; an inner liner wall (2); and a body of foamed-in-place insulation (3) therebetween.

The liner wall (2) is characterized in that it is a composite material comprising a thermoplastic synthetic resin sheet (4) defining a first surface portion and having applied to said surface a barrier film (5) which comprises a thermoplastic polyolefin resin. The barrier film is applied to the surface of the synthetic resin sheet that would normally come into contact with the insulation material.

The inner liner wall is molded thermally and/or by pressure into the desired liner configuration and inserted into the outer cabinet wall with the insulation being foamed-in-place. The two walls are held in a spaced relationship whilst the insulating material is introduced by a foam-in-place operation. The method of construction a refrigeration appliance unit in such a manner is disclosed in, for example, U.S. Pat. Nos. 3,960,631; 4,196,950; 4,505,919 and 4,707,401, the relevant portions of which are incorporated herein by reference.

In this present invention, the barrier film is a thermoplastic linear polyolefin resin and to be distinguished from a branched polyolefin resin.

There are, basically two types of olefin, polymerization techniques for preparing high molecular weight olefin polymers and copolymers. The oldest commercial technique involves high pressure and high temperature, and the use of a free radical initiator, such as a peroxide; the resulting polymers generally being known as low density polyethylene (LDPE), when using an ethylene monomer. These LDPE polymers contain branched chains of polymerized monomer units pendant from the main polymer backbone and typically have densities in the range of from about 910 to about 935 kilograms per cubic meter.

The other commercially used technique involves coordination catalysts of the "Ziegler" type or "Phillips" type and variants of the Ziegler type such as the Natta type. These catalysts when used to prepare polyethylene type resins result in polymers, which are usually known as "linear" polymers because of there negligible content or substantial absence of branched chains of polymerized monomer units pendant from the main polymer backbone, and are generally known as high density polyethylene (HDPE). Linear polyethylene (HDPE) typically has a density in the range of from about 940 to about 965 kilograms per cubic meter.

It is this latter polymerization technique which is used in preparing copolymers of ethylene with other alpha-olefins. When ethylene is copolymerized with other alpha-olefins using this technique, the effect of the comonomer is to lower the density below the HDPE range, but the polymer molecules remain of the "linear" type.

The preferred linear polyolefin resins for use as barrier film in this present invention are the "linear" type ethylene copolymers wherein ethylene has been polymerized along with minor amounts of alpha alkenes having from 3 to 12, preferably from 4 to 8 carbon atoms per alkene molecule. The amount of alkene comonomer is generally sufficient to cause the density of the resulting polymer to be within the same range as LDPE. The resulting polymer is classified as a "linear low density polyethylene" (LLDPE). LLDPE type polymers retain much of the strength and crystallinity normally associated with HDPE type polymers whilst also exhibiting characteristics of LDPE type polymers such as toughness and low modulus. Patent publication U.S. Pat. No. 4,365,220 discloses methods of producing LLDPE polymers and is incorporated herein by reference.

Of the linear thermoplastic polyolefins most preferred for use in this invention are HDPE and especially LLDPE. Other linear thermoplastic polyolefins contemplated for use within this invention include polypropylene and polybutylene.

The barrier film is present in a quantity and thickness sufficient to protect the synthetic resin sheet from attack by the physical blowing agent used in preparing the foamed-in-situ insulation. The quantity of barrier film, including optional glue layer that may be present, on the surface of the synthetic resin is conveniently expressed as a percentage thickness of the total thickness of the synthetic resin sheet and barrier film. Prior to thermolding, the barrier film constitutes at least 0.3, preferably at least 0.6 and more preferably at least 1 percent of said total thickness. Advantageously and for processing reasons, the amount of barrier film present need not be greater than about 20, preferably about 15, and more preferably about 10 percent of the combined resin sheet and barrier film thickness.

The thickness of barrier film present in the different regions of the shaped liner may vary depending on the degree of extension in the molding procedure. When preparing shaped or molded liners the draw ratio, or degree of extension of resin sheet to shaped liner, may be from about 1:1.1 to 1:10 and preferably from about 1:1.1 to about 1:6. When the liner material has been molded to a given shape and configuration, the thickness of the resulting barrier film advantageously is at least 1, preferably at least about 5 and more preferably at least about 10, microns. Where the barrier film is present in quantities less than this, it may be susceptible to mechanical failure, for example pin holing or destruction by for example abrasion, and thus not able to function as a barrier film protecting the entirety of the styrenic resin. Typically, after shaping of the liner the amount of barrier film present will not exceed about 100, preferably not exceed about 75, and more preferably not exceed about 50 microns.

As already described, the liner wall is a composite material comprising a thermoplastic synthetic resin sheet to which has been applied an above described barrier film.

For the purpose of this present invention the synthetic resin sheet comprises a styrene-based thermoplastic resin. Preferred styrenic resins are acrylonitrile-butadiene-styrene (ABS) copolymers and high impact polystyrene (HIPS) polymers. Such resins are preferred because they offer some inherent environmental stress crack resistance and primarily have good moldability.

The ABS copolymer resins sheets that can be used in this present invention are well known to those skilled in the art, the preparation of such material is disclosed in, for example, U.S. Pat. Nos. 3,563,845; 3,565,746; and 3,509,237 all of which are incorporated herein by reference.

Exemplary of the preferred styrenic polymers are those commercially available from The Dow Chemical Company and include the ABS resins such as MAGNUM TM 3404 and MAGNUM TM 3153, MAGNUM TM 9043 and the high impact polystyrene resins such as STYRON TM 469, STYRON TM 472 and STYRON TM 464.

The composite liner wall may be prepared by any of the conventionally known procedures. The barrier film may be laminated to the synthetic resin sheet by utilizing the inherent heat of extrusion of the synthetic resin sheet and a pressure application therebetween such as by suitable pressure rolls.

As mentioned above, optionally a glue layer may present. For certain applications, the public request that a glue layer be present to promote a feeling of solidness or rigidity to the insulative cabinet wall or structure of which the wall is a component. Exemplary of materials suitable for the glue layer include ethylene vinyl acetate. When scrap recovery of the styrene-based thermoplastic resin is practised, the presence of such a glue layer material can also serve to enhance compatibility of the polyolefin with the styrenic resin, especially HIPS resin.

Techniques involving coextrusion of the synthetic resin and barrier film may also be employed to prepare the composite liner material.

Techniques of applying a film by lamination to, or coextrusion with a synthetic resin sheet are well known to those skilled in the art of producing composite materials. Such techniques for the application of film are disclosed in, for example U.S. Pat. Nos. 3,960,631; 4,005,919; 4,707,401 and 4,196,950.

A preferred technique of preparing the composite material employed as liner material in this present invention is by lamination.

The insulation used in the insulative cabinet wall of this invention is preferably a closed-celled foam, although open-celled foam may be present when requirements concerning thermal insulation performance are not so demanding. Such closed-celled material is light weight and advantageously, has a high thermal resistance and a high compressive strength sufficient to contribute beneficially to the of overall structural strength of the wall. As the configuration and geometry of the outer and inner walls may vary, construction of the cabinet wall is facilitated if the insulation can be prepared by a foam-in-place procedure.

In the present invention, the preferred foamed-in-situ insulation is polyurethane foam. Polyurethane foam can be prepared by mixing intimately under reaction conditions an organic polyisocyanate with an isocyanate reactive, active hydrogen-containing compound such as, for example, a polyol in the presence of a blowing agent and introducing the foam-forming mixture into the space between the inner and outer liner walls of the cabinet.

Blowing agents employed in the preparation of the polyurethane are generally organic compounds having an atmospheric boiling point of from about $-50°$ C. to about $+100°$ C. Generally, such compounds selected for this purpose are halogenated organic compounds especially those containing fluorine and or chlorine have convenient boiling points and additional low thermal conductivity properties.

In the present invention, the preferred blowing agent for use in preparing the polyurethane foam are those comprising a hydrohalocarbon. Hydrohalocarbons are preferred over perhalogenated carbon compounds, with the exception of perfluorinated compounds, due to their generally lower ozone depleting potentials, though the use of perhalogenated carbon compounds such as trichlorofluoromethane and dichlorodifluoromethane in small amounts is not precluded from the present invention.

Suitable hydrohalocarbon compounds include hydrochlorofluorocarbons, hydrofluorocarbons and hydrochlorocarbons.

Exemplary of suitable hydrochlorofluorocarbons are dichlorofluoromethane (Refrigerant, R-21, b.p.; 8.9° C.), chlorodifluoromethane (R-22, b.p.; $-44°$ C.) dichlorotrifluoroethane (R-123, b.p.; 27.1° C. and isomer R-123a; b.p.; 28.2° C.), chlorotetrafluoroethane (R-124, b.p.; $-12°$ C. and isomer R-124a; b.p.; $-10.2°$ C.), chlorotrifluoroethane (R-133, all isomers, b.p.; 6.1° to 17° C.), dichlorofluoroethane (R-141b b.p.; 32° C.), chlorodifluoroethane (R-142, all isomers b.p. $-9.2°$ to 35.1° C.) and such like.

Exemplary of suitable hydrochlorocarbon compounds are 1,1,1-trichloroethane (b.p.; 74.1° C.), 1,2-dichloroethane (b.p.; 93.5° C.), 2-chloropentane (b.p. 96.9° C.), 1,3-dichloropentane (b.p.; 80.4° C.) and chloropropane.

Exemplary of suitable hydrofluorocarbon compounds are tetrafluoroethane (R-134, b.p.; $-19.7°$ C. and isomer R-134a, b.p.; $-26.5°$ C.); trifluororethane (R-143, b.p.; 5° C.).

Exemplary of non-halogen-containing organic compounds suitable as blowing agents halogen include cyclohexane (b.p. 80.7° C.), n-hexane (b.p. 69° C.), pentane (b.p. 35° C.), isopentane, isohexane, and the like. Mixtures of two or more such blowing agents are also suitable.

Preferred blowing agents for preparing the insulative polyurethane foam used in the present invention include R-123 and isomer R-123a, R-141b, R-142b, R-134 and -134a and 1,1,1-trichloroethane due to availability, ease of handling and due to the desirable physical properties of polyurethane foams prepared therewith.

The blowing agent is employed in quantities sufficient to provide for a foam advantageously having an overall bulk density of from about 10 to about 200, preferably about 15 to about 100, and more preferably about 18 to about 60 kg/m$^3$.

Active hydrogen-containing compounds which are useful in the preparation of the polyurethane foam include those materials having two or more groups which contain an active hydrogen atoms which can react with an isocyanate, such as are described in U.S. Pat. No. 4,394,491, incorporated herein by reference. Collectively, such compounds are referred to as polyahls. Preferred among such polyahl compounds are those having at least two hydroxyl, primary or secondary amine, carboxylic acid, or thiol groups per molecule. Polyols, i.e., compounds having at least two hydroxyl groups per molecule, are especially preferred due to their desirable reactivity with polyisocyanates.

Suitable isocyanate reactive materials for preparing rigid polyurethanes include those having an equivalent weight of about 50 to about 700, preferably about 70 to about 300 and more preferably about 70 to about 150. Such isocyanate-reactive materials also advantageously have a functionality of at least 2, preferably about 3, up to about 16, preferably up to about 8, active hydrogen atoms per molecule.

Suitable additional isocyanate-reactive materials include polyether polyols, polyester polyols, polyhydroxyl-terminated acetal resins, hydroxyl-terminated amines and polyamines, and the like. Examples of these and other suitable isocyanate-reactive materials are described more fully in U.S. Pat. No. 4,394,491, particularly in columns 3–5 thereof. Most preferred for preparing rigid foams, on the basis of performance, availability and cost, are polyester and especially polyether polyols. Suitable polyether polyols can be prepared by adding an alkylene oxide to an initiator having from about 2 to about 8, preferably about 3 to about 8 active hydrogen atoms. Exemplary of such polyether polyols include those commercially available under the trademark "VORANOL" such as VORANOL 202, VORANOL 360, VORANOL 370, VORANOL 446, VORANOL 490, VORANOL 575, VORANOL 800 all sold by The Dow Chemical Company.

Polyisocyanates useful in making polyurethanes include aromatic, aliphatic and cycloaliphatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylenediisocyanate, 3,3'-dimethoxy-4,4'-biphenylenediisocyanate and 3,3'-dimethyldiphenylpropane-4,4'-diisocyanate; triisocyanates such as toluene-2,4,6-triisocyanate and polyisocyanates such as 4,4'-dimethyldiphenylmethane-2,2',5',5'-tetraisocyanate and the diverse polymethylene polyphenyl polyisocyanates.

A crude polyisocyanate may also be used in the practice of this invention, such as the crude toluene diisocyanate obtained by the phosgenation of a mixture of toluene diamines or the crude diphenylmethane diisocyanate obtained by the phosgenation of crude diphenylmethanediamine. The preferred undistilled or crude polyisocyanates are disclosed in U.S. Pat. No. 3,215,652, incorporated by reference.

Especially preferred are methylene-bridged polyphenylpolyisocyanates, due to their ability to crosslink the polyurethane. The isocyanate index (ratio of equivalents of isocyanate to equivalents of active hydrogen-containing groups) is advantageously from about 0.9 to about 5.0, preferably about 0.9 to about 3.0, more preferably about 1.0 to about 1.5.

In addition to the foregoing critical components, it is often desirable to employ certain other ingredients in preparing cellular polyurethane. Among these additional ingredients are water, catalyst, surfactant, flame retardant, preservative, colorant, antioxidants, reinforcing agent, filler, and the like.

Water is often employed in the role as a blowing agent precursor and processing aid. Water can react with isocyanate leading to the generation of carbon dioxide gas which then functions as a blowing agent in the foam-forming reaction. When present, the water is preferably used in amounts not exceeding about 7, preferably about 6, more preferably about 5 parts by weight per 100 parts by total weight active hydrogen-containing compound(s) present. Beneficial effects are seen when at least about 0.5 and preferably at least about 1 part of water per 100 parts total weight active hydrogen-containing compound(s), is present. Using amounts of water which exceeds these ranges is possible but the resulting foam may have undesirable physical properties such as poor dimensional stability and poor thermal insulation.

In making polyurethane foam, it is generally highly preferred to employ a minor amount of a surfactant to stabilize the foaming reaction mixture until it cures. Such surfactants advantageously comprise a liquid or solid organosilicone surfactant. Other, less preferred surfactants include polyethylene glycol ethers of long chain alcohols, tertiary amine or alkanolamine salts of long chain alkyl acid sulfate esters, alkyl sulfonic esters and alkyl arylsulfonic acids. Such surfactants are employed in amounts sufficient to stabilize the foaming reaction mixture against collapse and the formation of large, uneven cells. Typically, about 0.2 to about 5 parts of the surfactant per 100 parts by total weight active hydrogen-containing compound(s) present are generally sufficient for this purpose.

One or more catalysts for the reaction of the active hydrogen-containing compound(s) with the polyisocyanate are advantageously used. Any suitable urethane catalyst may be used, including tertiary amine compounds and organometallic compounds. Exemplary tertiary amine compounds include triethylenediamine, N-methyl morpholine, pentamethyldiethylenetriamine, tetramethylethylenediamine, 1-methyl-4-dimethylaminoethylpiperazine, 3-methoxy-N-diethylpropylamine, N-ethyl morpholine, diethylethanolamine, N-coco morpholine, N,N-dimethyl-N', N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates, such as an alkali metal alkoxide, may also optionally be employed herein. Such catalysts are used in an amount which measurably increases the rate of reaction of the polyisocyanate. Typical amounts are about 0.001 to about 1 parts of catalyst per 100 parts by total weight of active hydrogen-containing compound(s) present.

In making a polyurethane foam, the active hydrogen-containing compound(s), polyisocyanate and other components are contacted, thoroughly mixed and permitted to react and to expand and cure into a cellular polymer. The particular mixing apparatus is not critical, and various types of mixing head and spray apparatus are conveniently used. It is often convenient, but not necessary, to pre-blend certain of the raw materials prior to reacting the polyisocyanate and active hydrogen-containing components. For example, it is often useful to blend the active hydrogen-containing compound(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the active hydrogen-containing compound(s) with the polyisocyanate to form a prepolymer.

ILLUSTRATIVE EMBODIMENTS

The following examples are given to illustrate the invention and should not be interpreted as limiting it in any way. Unless stated otherwise, all parts and percentages are given by weight.

EXAMPLE 1

A shaped inner liner suitable for use in fabricating a refrigeration appliance unit is prepared by thermal molding of a composite material. The composite material is characterized in that a high impact polystyrene resin, STYRON TM 469, has applied to it a linear, low density polyethylene (LLDPE) film, DOWLEX TM 2343E available from The Dow Chemical Company. The amount of film present in the composite material prior to thermal molding is given in Table I expressed as a percent thickness based on the total thickness of the composite material. The thermal molding, or draw rates of the composite material to the shaped inner liner is 1:5.

The shaped inner liner is placed in a suitable mold and polyurethane foam poured-in-place against the polyethylene film layer film of the shaped liner. On curing the complete unit comprising molded polyurethane foam having an average density of 30 Kg/m3 and an inner liner with barrier film is subjected to thermocycling.

Thermocycling serves the purpose of accelerating the observation of solvent attack, if any on the inner line.

The thermocycle study comprises holding the foam and inner liner material at −20° C. for 8 hours, proceeding by a period of 16 hours at +40° C. and then a second period of 8 hours at −20° C. and so forth for a given period of time. It is found that conducting thermocycle studies for periods of up to about 10 weeks is generally sufficient to provide for a realistic estimation of performance of the unit and barrier film.

When the thermocycling is complete, the degree of attack upon the styrenic resin by the blowing agent used in preparing the polyurethane foam can be assessed by counting the number of "surface" blisters observable on the opposite face of the inner liner to that in contact with the barrier film and polyurethane foam. A lower blister count being indicative of a greater degree of protection afforded by the barrier film present.

Table I indicates the results of the thermocycling study for a different thickness of linear low density polyethylene (LLDPE) barrier film, indicated percent thickness is for composite material prior to drawing and shaping to give the inner liner.

Foam A is an appliance-designed rigid polyurethane foam prepared from the commercially available polyol formulation VORANOL TM RST 461 sold by The Dow Chemical Company, reacted with a crude polymeric polyisocyanate average functionality 2.7. The physical blowing agent is dichlorotrifluoroethane (R-123) used in an amount to provide a foam having a free rise density of about 22 Kg/M3.

Foam B is polyurethane foam prepared from similar components as Foam A only in this instance the polyol formulation VORANOL TM RST 461 has been modified by addition of water allowing for a 50 percent weight reduction in the amount of Refrigerant-123 required to provide foam of free-rise density about 22 Kg/M3. An additional amount of isocyanate is used to compensate for the greater amount of water present.

The shape of the molded inner liner is such to provide points susceptible to attack. These points are identified as the edge or door frame; the lip or glider support/runner for a shelf; and the partition finger separating the colder freezer box of the refrigeration appliance unit from the slightly warmer main storage area.

TABLE I

| Sample No. | Foam type | LLDPE thickness % | Thermocycling (weeks) | Blister Count | | |
|---|---|---|---|---|---|---|
| | | | | Edge | Glider | Partition |
| 1 | A | 5 | 12 | 0 | 0 | 0 |
| 2 | A | 10 | 12 | 0 | 0 | 0 |
| 3 | A | 15 | 12 | 0 | 0 | 0 |
| 4 | B | 5 | 8 | 0 | 0 | 0 |
| 5 | B | 5 | 8 | 0 | 0 | 0 |
| A* | A | 0 | 4 | >100 | 20 | >100 |
| B*[1] | A | 5[1] | 10 | 2 | 10 | 10 |

Footnotes:
*not an example of this invention
[1]In comparative example B, the barrier film is a polyethylenephthlate-glycol modified polymer, Kodar PET-G 6763 sold by Eastman chemical Products Inc.

The data presented in Table I indicates the significant reduction in the number of blisters to be observed in the styrenic resin when protected by the LLDPE barrier film.

In comparison to LLDPE, a coextruded film comprising a branched, low density polyethylene (LDPE) resin is applied to the high impact polystyrene resin, STYRON TM 469 and contacted with Foam A. The thickness of coextruded film on the surface of the polystyrene resin is about 50 microns. Blister counts observed after 4 weeks thermocycling for the above-identified regions, respectively, are >100; 18; and >100.

The comparative experiment with the coextruded film comprising a branched, low density polyethylene (LDPE)resin illustrates the importance selecting the correct type of polyolefin resin as barrier film.

What is claimed is:
1. An insulative cabinet wall structure for use in a thermally insulated apparatus which comprises:
   a. an outer wall element;
   b. an inner wall element comprising a styrene-based thermoplastic resin;
   c. a foamed-in-situ polyurethane foam contiguous to said outer wall element and positioned between said outer wall element and said inner wall element; and
   d. a barrier film interposed between said foamed-in-situ polyurethane foam and said inner wall element, characterized in that the barrier film comprises a linear low density polyethylene (LLDPE) or a high density polyethylene (HDPE) resin.

2. The insulative cabinet wall structure of claim 1 wherein the polyurethane foam is prepared in the presence of a physical blowing agent comprising a hydrohalocarbon compound.

3. The insulative cabinet wall structure of claim 2 wherein the hydrohalocarbon is a hydrochlorofluorocarbon comprising dichlorotrifluoroethane, dichlorofluoroethane, difluorochloroethane, or mixtures thereof.

4. The insulative cabinet wall structure of claim 2 wherein the hydrohalocarbon is the hydrofluorocarbon, tetrafluoroethane.

5. The insulative cabinet wall structure of claim 1 wherein the barrier film has a thickness of at lest 1 micron.

6. The insulative cabinet wall structure of claim 5 wherein the barrier film reduces the amount of blistering observed on the synthetic resin sheet.

7. The insulative cabinet wall of claim 5 wherein the styrene-based thermoplastic resin is a high impact polystyrene resin or an acrylonitrile-butadiene-styrene copolymer resin.

8. The insulative cabinet wall of claim 7 wherein the styrene-based thermoplastic resin is in contact with a barrier film consisting essentially of a thermoplastic linear low density polyethylene resin present in a thickness of at least 1 micron and wherein the foamed-in-situ polyurethane foam is prepared in the presence of a physical blowing agent comprising dichlorotrifluoroethane, dichlorofluoroethane, tetrafluoroethane, difluorochloroethane, or mixtures thereof.

9. The insulative cabinet wall of claim 1 further comprising a glue layer between the styrene-based thermoplastic resin sheet and the barrier film.

10. A composite material suitable for thermomolding which comprises:

a styrene-based thermoplastic resin sheet; and a barrier film in contact with said resin sheet, characterized in that the barrier film constitutes at lest 0.3 percent of the total thickness of the resin sheet and barrier film, and wherein said barrier film comprises a linear low density polyethylene (LLDPE) or a high density polyethylene (HDPE) resin.

* * * * *